(12) United States Patent
Hinata

(10) Patent No.: US 7,602,451 B2
(45) Date of Patent: Oct. 13, 2009

(54) INPUT DEVICE, ELECTRO-OPTICAL DEVICE, ELECTRONIC APPARATUS, METHOD OF MANUFACTURING INPUT DEVICE, AND METHOD OF MANUFACTURING ELECTRO-OPTICAL DEVICE

(75) Inventor: Shoji Hinata, Matsumoto (JP)

(73) Assignee: Seiko Epson Corporation (JP)

( * ) Notice: Subject to any disclaimer, the term of this patent is extended or adjusted under 35 U.S.C. 154(b) by 533 days.

(21) Appl. No.: 11/143,292

(22) Filed: Jun. 2, 2005

(65) Prior Publication Data

US 2005/0280635 A1    Dec. 22, 2005

(30) Foreign Application Priority Data

Jun. 22, 2004  (JP) ............................. 2004-183601

(51) Int. Cl.
*G02F 1/1335* (2006.01)
*G06F 3/041* (2006.01)

(52) U.S. Cl. .................. 349/12; 345/173; 349/158

(58) Field of Classification Search ............ 349/12, 349/158; 345/173, 174
See application file for complete search history.

(56) References Cited

U.S. PATENT DOCUMENTS 6,501,528 B1 * 12/2002 Hamada ............... 349/158

| | | | |
|---|---|---|---|
| 2001/0026330 A1 * | 10/2001 | Oh | 349/12 |
| 2002/0044241 A1 * | 4/2002 | Matsuo | 349/113 |
| 2002/0101409 A1 | 8/2002 | Yokoyama et al. | |
| 2004/0095335 A1 * | 5/2004 | Oh et al. | 345/173 |
| 2008/0018618 A1 * | 1/2008 | Hill et al. | 345/177 |

FOREIGN PATENT DOCUMENTS

| | | |
|---|---|---|
| CN | 1356226 | 7/2002 |
| JP | 05-249423 | 9/1993 |
| JP | 10-326153 | 12/1998 |
| JP | 11-271739 | 10/1999 |
| JP | 2001-134380 | 5/2001 |
| JP | 2003-043450 | 2/2003 |
| JP | 2003-255855 | 9/2003 |
| JP | 2004-212780 | 7/2004 |

* cited by examiner

*Primary Examiner*—David Nelms
*Assistant Examiner*—Nathanael R Briggs
(74) *Attorney, Agent, or Firm*—Harness, Dickey & Pierce, P.L.C.

(57) ABSTRACT

An input device includes a first substrate that has a coordinate input surface, and a second substrate that faces the first substrate. In the input device, a position on the coordinate input surface of the first substrate is directly indicated, such that coordinate information at the indicated position is input. The first substrate and the second substrates are made of glass substrates. According to the coordinate input surface of the first substrate, a thin-plate region having a thinner thickness than the periphery of the coordinate input surface is formed.

9 Claims, 5 Drawing Sheets

INPUT DEVICE, ELECTRO-OPTICAL DEVICE, ELECTRONIC APPARATUS, METHOD OF MANUFACTURING INPUT DEVICE, AND METHOD OF MANUFACTURING ELECTRO-OPTICAL DEVICE

RELATED APPLICATIONS

This application claims priority to Japanese Patent Application No. 2004-183601 filed Jun. 22, 2004 which is hereby expressly incorporated by reference herein in its entirety.

BACKGROUND OF THE INVENTION

1. Technical Field

The present invention relates to an input device such as a touch panel or the like, an electro-optical device having the input device, an electronic apparatus, a method of manufacturing the input device, and a method of manufacturing the electro-optical device.

2. Related Art

In recent years, with the spread of small information electronic apparatuses such as personal digital assistant (PDAs), palmtop computers or the like, a liquid crystal display device in which a touch panel is mounted on a liquid crystal panel as an input device has been widely used. As a touch panel, a resistive film type in which two substrates, each having a resistive film such as ITO or the like, are bonded with a spacer interposed therebetween is known. The resistive film-type touch panel has a structure in which two substrates, each having a planar electrode made of ITO or the like, are arranged to face each other at a predetermined gap and a wiring section for deriving signals is formed at an edge of the planar electrode of one of the substrates. In such a liquid crystal display device, a screen of the liquid crystal panel can be viewed through the transparent touch panel and the touch penal is touched by a finger or a pen according to an instruction on the screen to be viewed, such that positional information of the touched portion can be input (see Japanese Unexamined Patent Application Publication No. 2003-43450).

In the related art, in order to provide a touch panel which is thin and light in weight, one or both of the opposite substrates are made of a plastic film substrate. However, since the plastic film substrate generates large deflection due to an input load, when an input is performed, a crack is generated in a resistive film and thus input characteristics deteriorate. Further, since the plastic film substrate has a low heat-resistant temperature, a high-temperature heat treatment cannot be performed at the time of the film formation. Accordingly, only a film having low transmittance is obtained. Further, since the plastic film substrate corrodes by an etchant, in the touch panel of the related art, a conductive material, such as silver paste or the like, which can be formed by means of printing methods is used for a wiring portion. Such a conductive material has a large resistance (for example, a specific resistance of silver paste is about $3 \times 10^{-4}$) as compared to a metal film which is formed by means of sputtering methods. Thus, in order to ensure sufficient conductance, a line width needs to be widened and a large substrate region for the wiring portion is required. Further, since silver paste has a large interfacial resistance with respect to the planar electrode made of ITO or the like, an equi-potential line may be partially distorted and sufficient detection precision may not be obtained. In addition, the plastic film substrate has optical anisotropy. Accordingly, in an inner-type liquid crystal display device in which a liquid crystal panel and a touch panel are integrated with two optical films (polarizing plate and the like) interposed therebetween, sufficient display characteristics cannot be obtained. A plastic film substrate which does not have optical anisotropy is expensive, thus the manufacturing cost of a device is increased.

As a countermeasure against the above-described problems, a configuration in which both substrates of the touch panel are made of hard glass substrates has been considered. In such a touch panel, since the hardness of the substrate is high, the substrate is not deformed by so much when the input is performed. Further, since the glass substrate has high heat-resistance, the quality of the resistive film itself can be improved by the high-temperature heat treatment. For this reason, the resistive film hardly deteriorates though used for a long time, such that an input device having high durability is obtained. Further, with the improvement of the quality of the resistive film, transmittance is increased, such that a bright display device can also be constructed. However, in the case in which the glass substrate having high hardness is adopted, the input load is increased or the substrate is not deflected so easy when an input is performed, such that the detection precision of an input position is degraded. In this case, when the substrate is reduced in thickness to 0.1 mm, the above-described problems do not occur. However, if the substrate is reduced in thickness, it is hard to handle the substrate or the substrate may be cracked during the manufacturing process. Further, since the substrate is vulnerable to a mechanical impact, when the touch panel is used for portable devices, it is likely to be damaged by an impact such as being dropped.

Here, a case in which the resistive film-type touch panel is used as the input device is described. In addition to the resistive film-type touch panel, as a touch panel, a capacitive touch panel or an ultrasonic touch panel is known. The above-described problems are common to the other types of touch panels. Further, even when the liquid crystal panel is substituted with other display panels such as organic electroluminescent (EL) panels or the like, the same problems occur.

SUMMARY

An advantage of the invention is that it provides an input device, such as a touch panel which uses a glass substrate, which can reduce an input load at the time of an input operation, enhance detection precision, and easily handle a substrate during a manufacturing process, an electro-optical device, an electronic apparatus, a method of manufacturing the input device, and a method of manufacturing the electro-optical device.

According to a first aspect of the invention, an input device includes a first substrate that has a coordinate input surface, and a second substrate that faces the first substrate. A position on the coordinate input surface of the first substrate is directly indicated, such that coordinate information at the indicated position is input. The first substrate and the second substrate are made of glass substrates. Further, according to the coordinate input surface of the first substrate, a thin-plate region having a reduced thickness than the periphery of the coordinate input surface is formed. In this case, the thin-plate region may be deflectably reduced in thickness.

As described above, in the input device which uses the glass substrate, in view of ease of handling the substrate or durability and impact resistance of the input device, the substrate is preferably thick. On the other hand, in view of ease of input or detection precision, the substrate is preferably thin. In the first aspect of the invention, in order to meet both demands, a method in which a substrate (the first substrate) at a coordinate input side of the input device is thickened and only a required portion of the substrate is selectively reduced in thickness is adopted. That is, in the first aspect of the invention, a portion including the coordinate input surface of the substrate is reduced in thickness, such that the input load can be reduced and the detection precision can be enhanced. On the other hand, a thick portion (hereinafter, also referred to as a thick-plate region) remains in a frame shape around the coordinate input surface of the substrate, such that impact resistance can be enhanced and the substrate can be easily handled during the manufacturing process. For this reason, operationality and reliability, which were problems inherent in the related art, can be enhanced. Further, in such a manner, when the thin-plate region is provided, the weight of the first substrate is also lightened, and thus an input device which is light in weight can be provided.

It is preferable that the first substrate and the second substrate are bonded by sealing materials which are provided in ring shapes on peripheral portions of the first and second substrates. Further, a circumferential position of the thin-plate region of the first substrate may be arranged, in a plan view, within a region where the sealing material is formed or on a region outside the sealing material.

In the first aspect of the invention, it is assumed that the above-described input device is mounted on a display surface of an electro-optical panel such as a liquid crystal panel or the like, and the input device and the electro-optical panel are integrally supported and fixed on a case, such as a bezel, in which a window is formed to correspond to the coordinate input surface. However, if end portions of the input device are fixed on such a case, the coordinate input surface of the input device may be pressed due to stress from the case, which results in causing an erroneous input. The first aspect of the invention is intended to suggest a countermeasure against this problem. In accordance with the first aspect of the invention, since the thin-plate region is formed according to the coordinate input surface of the first substrate, the stress from the case is applied to the thick-plate region around the coordinate input surface. Further, in accordance with the first aspect of the invention, the circumferential position of the thin-plate region is arranged on or outside the sealing material and the thick-plate region is arranged on or outside the sealing material. Thus, the stress is applied to a region (that is, a surface other than the coordinate input surface) outside the sealing material which has no relation to the input operation, such that the erroneous input does not occur.

In accordance with the first aspect of the invention, a liquid material for adjusting a refractive index (for example, a liquid material, such as silicon oil, having a difference in refractive index from glass smaller than that from air) may be sealed into a space surrounded by the first substrate, the second substrate, and the sealing materials.

As such, an input device in which reflection on an interface is suppressed and has high transmittance can be constructed. Further, the sealed liquid material serves as a cushion for relieving the input stress. Thus, the impact resistance of the input device is enhanced.

In accordance with the first aspect of the invention, a buffing member made of an elastic member (for example, a spacer structure made of a soft material such as silicon or urethane) may be provided between the first substrate and the second substrate.

As such, since the buffing member is provided, the impact resistance of the input device can be increased.

According to a second aspect of the invention, an electro-optical device includes an electro-optical panel, and the above-described input device that is arranged on a front surface of the electro-optical panel. As the electro-optical panel, a liquid crystal panel which includes a third substrate arranged on the front surface, a fourth substrate facing the third substrate, and liquid crystal interposed between the third substrate and the fourth substrate may be adopted.

In accordance with the second aspect of the invention, an electro-optical device which has high durability or reliability and which is excellent in detection precision when the input is performed can be provided.

In this case, the input device and the electro-optical panel may be optically bonded by a transmissive elastic member (for example, a transmissive elastic member, such as silicon gel, acryl gel, urethane gel, urethane rubber, or the like, which has a difference in refractive index from glass smaller than air).

As such, the reflection on the interface between the electro-optical panel and the input device is suppressed and thus bright display can be performed. Further, since the stress that is applied to the liquid crystal panel when the input is performed is relieved, a display distortion hardly occurs.

It is preferable that a first optical film (a polarizing plate or the like) is provided on the front surface of the electro-optical panel and is arranged on the thin-plate region that is formed on the first substrate of the input device.

In accordance with the second aspect of the invention, the electro-optical device is a so-called inner-type electro-optical device in which the liquid crystal panel and the input device are integrated and are arranged between optical films. As described above, in the inner-type electro-optical device of the related art, the plastic film substrate is arranged between the liquid crystal panel and the optical film, and thus an expensive plastic film substrate with no optical anisotropy needs to be used. On the contrary, in accordance with the second aspect of the invention, any of the substrates of the input device is made of the glass substrate, and thus such a problem regarding optical anisotropy does not occur. Therefore, the electro-optical device having the associated configuration can be provided at low cost as compared to the related art. In particular, in accordance with the second aspect of the invention, since the first optical film at the front surface is arranged on the thin-plate region of the first substrate, a thin electro-optical device can be provided as compared to the related art.

It is preferable that a second optical film (a phase plate or the like) is provided between the electro-optical panel and the first optical film and is arranged on the thin-plate region that is formed on the first substrate of the input device.

As such, the second optical film is provided to be arranged on the thin-plate region of the first substrate, and thus the total thickness of the electro-optical device can be reduced.

It is preferable that a second optical film (a phase plate or the like) is provided between the electro-panel and the first optical film and is arranged between the electro-optical panel and the input device.

As described above, in accordance with the second aspect of the invention, since any of the substrates of the input device is made of the glass substrate, positional relationship between the input device and the optical films can be freely designed. For this reason, as described above, the input device may be arranged below the second optical film (between the liquid crystal panel and the second optical film). Alternatively, the input device may be arranged above the first optical film (between the second optical film and the first optical film or above the first optical film). When the second optical film and the first optical film are laminated above the input device, the total thickness of these optical members becomes large, such that an input pressure is not sufficiently transferred to the coordinate input surface. In this case, like the configuration of the second aspect of the invention, it is preferable that the second optical film and the first optical film are separately attached above and below the input device. In such a manner, the input operation can be easily performed.

It is preferable that, on a rear surface of the fourth substrate of the electro-optical panel, a thin-plate region having a reduced thickness than the periphery is formed at a position which faces the coordinate input surface of the input device.

As described above, in the electro-optical device in which the input device is mounted on the front surface of the liquid crystal panel, when a finger or a pen is pressed on the coordinate input surface, the third substrate of the liquid crystal panel is partially deflected by the pressure. The deflection of the substrate changes the gap between the substrates, thereby generating the display distortion. On the contrary, in accordance with the second aspect of the invention, since the thin-plate region is formed on the fourth substrate of the liquid crystal panel, the fourth substrate is easily deflected. Therefore, when the third substrate is deflected by the above-described input operation, the fourth substrate is also deflected accordingly. For this reason, the partial change in gap is suppressed and thus the display distortion hardly occurs.

It is preferable that a third optical film (a polarizing plate or the like) is provided on a rear surface of the electro-optical panel and is arranged on the thin-plate region that is formed on the fourth substrate of the electro-optical panel.

In accordance with the second aspect of the invention, there is provided an inner-type electro-optical device in which the optical film (the third optical film) provided on the rear surface of the liquid crystal panel is arranged on the thin-plate region of the fourth substrate of the liquid crystal panel. In such a manner, a thin electro-optical device can be provided as compared to the related art.

According to a third aspect of the invention, an electronic apparatus includes the above-described electro-optical device.

In accordance with the third aspect of the invention, an electronic apparatus which has high durability or reliability and which is excellent in detection precision when the input is performed can be provided.

According to a fourth aspect of the invention, there is provided a method of manufacturing an input device which has a first substrate having a coordinate input surface and a second substrate facing the first substrate and in which a position on the coordinate input surface of the first substrate is directly indicated, such that coordinate information at the indicated position is input. The method includes bonding the first substrate and the second substrate, each being made of a glass substrate, by sealing materials which are provided in ring shapes on peripheral portions of the first and second substrates, and forming, according to the coordinate input surface of the first substrate, a thin-plate region having the reduced thickness than the periphery of the coordinate input surface.

In accordance with the fourth aspect of the invention, the portion corresponding to the coordinate input surface in the first substrate is reduced in thickness. Thus, as compared to the case in which the glass substrates are simply bonded, the input load can be reduced and the detection precision can be increased. Further, in accordance with the fourth aspect of the invention, a thick portion (hereinafter, also referred to as a thick-plate region) remains in a frame shape around the coordinate input surface, without reducing the thickness of the entire substrate. Therefore, the first substrate has improved impact resistance or ease of handling, such that the manufacturing process can be simplified.

In this case, the method of manufacturing an input device may further include sealing a liquid material for adjusting a refractive index into a space surrounded by the first substrate, the second substrate, and the sealing materials.

As such, an input device in which the reflection on the interface is suppressed and has high transmittance can be constructed. Further, the sealed liquid material serves as a cushion for relieving the input stress. Thus, the impact resistance of the input device is enhanced.

In this case, the method of manufacturing an input device may further include forming a buffing member made of an elastic member on a surface of the first substrate or second substrate.

As such, since the buffing member is provided, the impact resistance of the input device can be increased.

In this case, the bonding of the first substrate and the second substrate may include bonding a first mother substrate having a plurality of substrate regions, each serving as the first substrate, and a second mother substrate having a plurality of substrate regions, each serving as the second substrate, by the sealing materials formed on the respective substrate regions. Further, the forming of the thin-plate region on the first substrate may include forming the thin-plate region on a region which is the coordinate input surface of each of the substrate regions of the first mother substrate. At this time, the method of manufacturing an input device may further include, after the forming of the thin-plate region on the first substrate, cutting the bonded first and second mother substrates to separate input devices from each other. Here, the cutting of the first mother substrate may be performed by cutting a region other than the thin-plate region on the first mother substrate.

In accordance with the fourth aspect of the invention, a method in which a plurality of input devices are formed in a lump with a large mother substrate is adopted. In this method, when cutting the first mother substrate, the thick-plate region around the thin-plate region of the substrate is cut, such that the substrate is hardly cracked. As a result, the yield can be enhanced. Moreover, when two mother substrates are different in thickness, a cutting stress is dispersed and thus cutting cannot be performed. Therefore, it is preferable that the first mother substrate and the second mother substrate substantially have the same thickness.

According to a fifth aspect of the invention, a method of manufacturing an electro-optical device which has an electro-optical panel and an input device arranged on a front surface of the electro-optical panel. Here, the input device is manufactured by the above-described method. Further, it is preferable that manufacturing the electro-optical panel includes bonding a third substrate arranged on the front surface and a fourth substrate facing the third substrate by sealing materials which are provided in ring shapes on peripheral portions of the third and fourth substrates, and sealing liquid crystal into a space surrounded by the third substrate, the fourth substrate, and the sealing materials.

In accordance with the fifth aspect of the invention, an electronic apparatus which has high durability or reliability and which is excellent in detection precision when the input is performed can be manufactured.

In accordance with the fifth aspect of the invention, the total thickness of the first substrate and the second substrate of the input device may be substantially equal to the total thickness of the third substrate and the fourth substrate of the electro-optical panel.

Since the input device has a structure in which two glass substrates are integrally bonded by the sealing material, it can be basically manufactured by the same manufacturing method as that of the liquid crystal panel. For this reason, as described above, when the total thickness of two substrates of the input device is substantially equal to the total thickness of two substrates of the liquid crystal panel, the manufacturing line of the input device can be applied to the manufacturing line of the liquid crystal panel.

In this case, the manufacturing the electro-optical panel may include forming a thin-plate region having a reduced thickness than the periphery at a position facing the coordinate input surface of the input device on a rear surface of the fourth substrate of the electro-optical panel.

As such, if the thin-plate region is formed, the fourth substrate is easily deflected. Thus, for example, when the third substrate of the liquid crystal panel is deflected by the input pressure, the fourth substrate can be deflected accordingly. For this reason, the partial change in gap can be suppressed and thus the display distortion can be prevented.

In this case, the bonding of the third substrate and the fourth substrate may include bonding a third mother substrate having a plurality of substrate regions, each serving as the third substrate, and a fourth mother substrate having a plurality of substrate regions, each serving as the fourth substrate, by the sealing materials formed on the respective substrate regions. Further, the forming of the thin-plate region on the fourth substrate may include forming the thin-plate region on a region which is the coordinate input surface of each of the substrate regions of the fourth mother substrate. At this time, the method of manufacturing an electro-optical device may further include, after the forming of the thin-plate region on the fourth substrate, cutting the bonded third and fourth mother substrates to separate electro-optical panels from each other. Here, the cutting of the fourth mother substrate may be performed by cutting a region other than the thin-plate region on the fourth mother substrate.

In accordance with the fifth aspect of the invention, a method in which a plurality of electro-optical panels are formed in a lump with a large mother substrate is adopted. In this method, when cutting the fourth mother substrate, the thick-plate region around the thin-plate region of the substrate is cut, such that the substrate is hardly cracked. As a result, the yield can be enhanced. Moreover, when two mother substrates are different in thickness, a cutting stress is dispersed and thus cutting cannot be performed. Therefore, it is preferable that the third mother substrate and the fourth mother substrate have the substantially same thickness.

BRIEF DESCRIPTION OF THE DRAWINGS

The invention will be described with reference to the accompanying drawings, wherein like numbers reference like elements, and wherein.

DESCRIPTION OF THE EMBODIMENTS

Figure 1:
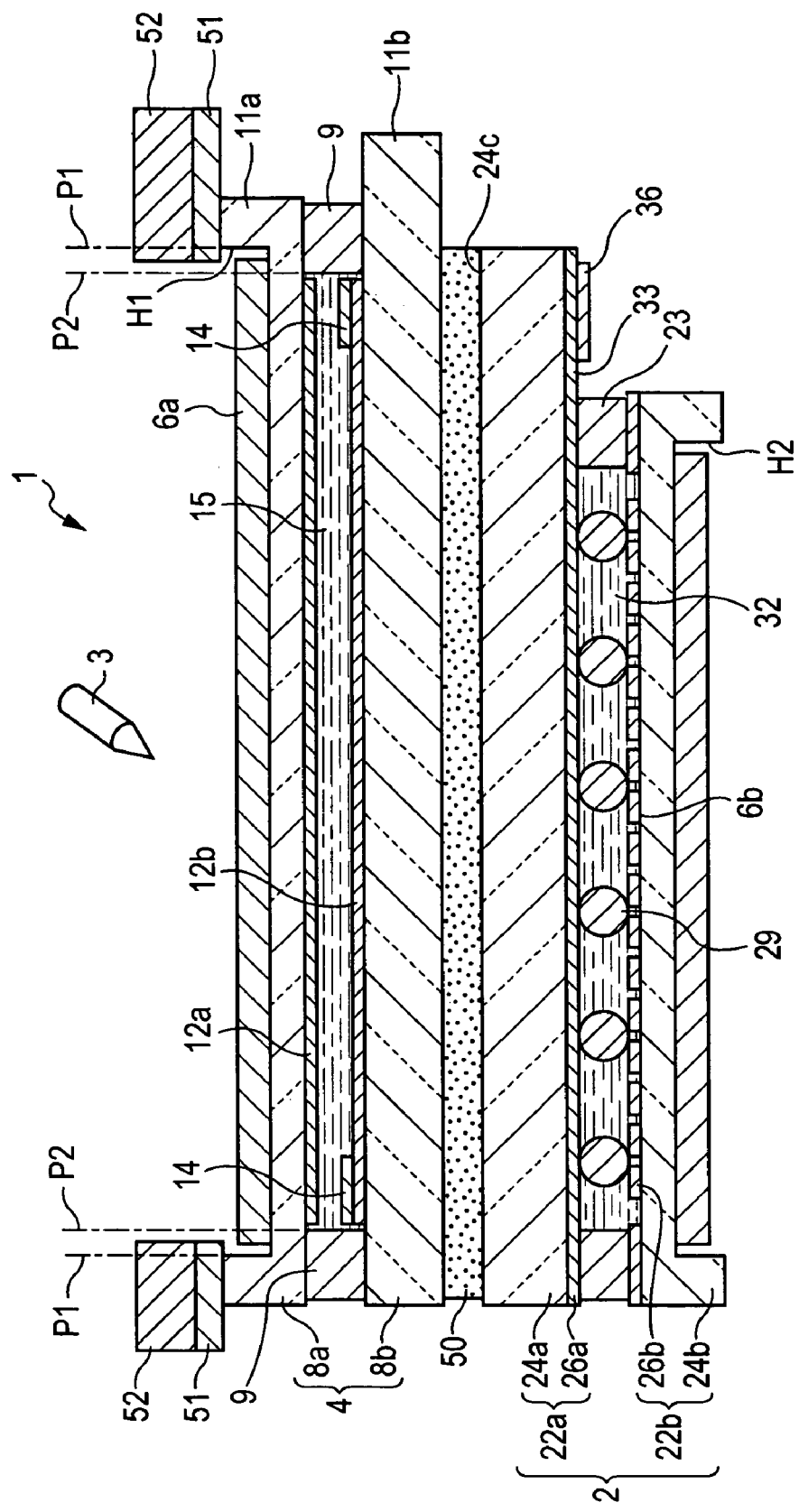
FIG. 1 is a cross-sectional view showing a schematic configuration of a touch panel-integrated liquid crystal display device of the invention.

Hereinafter, an embodiment of the invention will be described with reference to the drawings. Moreover, the film thickness, the ratio of the size, and the like of each element are properly modified in order to be recognizable in the drawings.

Electro-Optical Device

Figure 2:
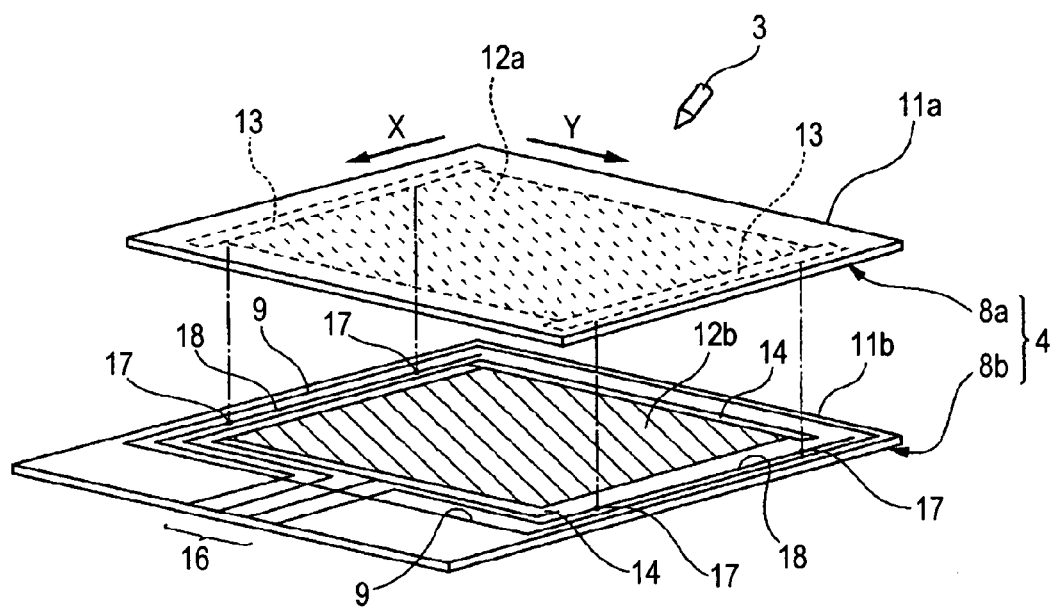
FIG. 2 is an exploded perspective view showing a structure of a touch panel.
Figure 3:
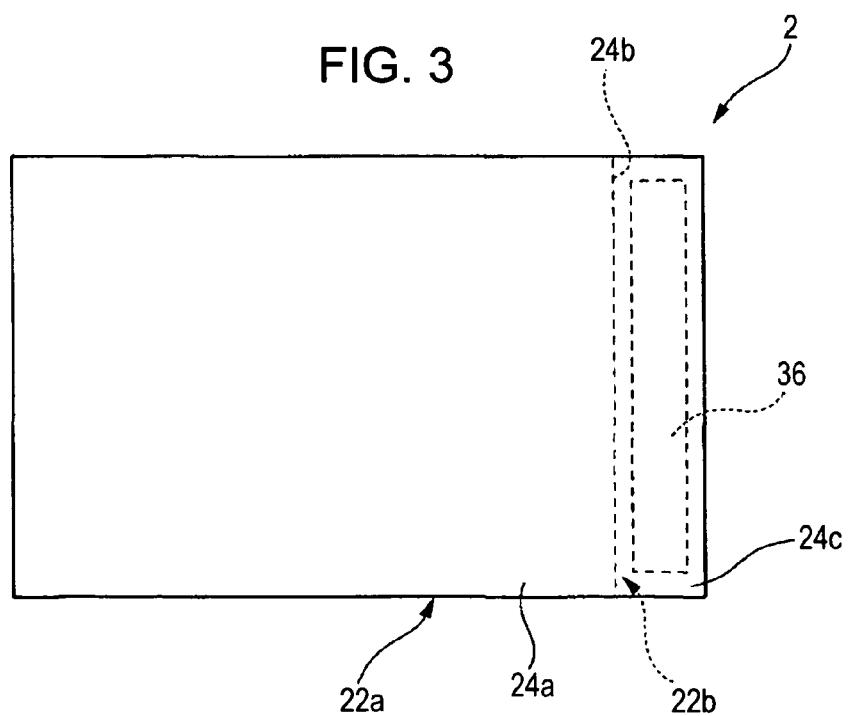
FIG. 3 a plan view of a liquid crystal panel as viewed from the touch panel.

FIG. 1 is a cross-sectional view schematically showing a touch panel-integrated liquid crystal display device which is an example of an electro-optical device of the invention. FIG. 2 is an exploded perspective view showing a structure of the touch panel. FIG. 3 is a plan view of a liquid crystal panel provided in the liquid crystal display device as viewed from the touch panel.

A liquid crystal display device 1 of the present embodiment schematically has a liquid crystal panel (an electro-optical panel) 2 serving as a display unit and an analog resistive film-type touch panel (an input device) 4 provided on a front surface thereof (an upper side in FIG. 1; a viewing side).

The liquid crystal panel 2 is formed by integrally bonding a front surface-side substrate (a third substrate) 22a and a rear surface-side substrate (a fourth substrate) 22b, which face each other with liquid crystal 32 interposed therebetween, by sealing materials 23 which are provided in ring shapes on peripheral portions of the two substrates. On a surface facing a liquid crystal layer of a substrate main body 24a made of a transmissive material of the front surface-side substrate 22a arranged at the viewing side, front surface-side transmissive electrodes (a third electrode) 26a or a liquid crystal alignment control layer having an alignment film (not shown) or the like are formed. On a surface facing the liquid crystal layer of a substrate main body 24b made of a transmissive material of the rear surface-side substrate 22b arranged opposite to the viewing side (a lower side in FIG. 1), transmissive rear surface-side electrodes (a fourth electrode) 26b or a liquid crystal alignment control layer having an alignment film (not shown) or the like are formed. A gap between the two substrates 22a and 22b is maintained uniformly by spacers 29. The liquid crystal panel 2 may be a passive matrix type or an active matrix type. A liquid crystal alignment mode may be any of various known modes such as TN (twisted nematic), VAN (vertically aligned nematic), STN (supertwisted nematic), ferroelectric, antiferroelectric, or the like. Further, a color filter may be arranged on any of the two substrates to perform color display. Further, a reflecting film may be formed on the rear surface-side substrate 22b to construct a reflective liquid crystal display device. In addition, transmissive portions such as opening portions or slits may be formed in the reflecting film to construct a transflective liquid crystal display device.

As shown in FIG. 3, on the front surface-side substrate 22a, an extended portion 24c which extends toward a circumference of the rear surface-side substrate 22b is provided. The extended portion 24c is used as a mounting-terminal forming region. The front surface-side electrodes 26a of the front surface-side substrate 22a extends toward the extended portion 24c and constitutes a portion of a terminal pattern 33. Further, the rear surface-side electrodes 26b of the rear surface-side substrate 22b are electrically connected to the terminal pattern 33 of the extended portion 24c via connecting members (not shown). The terminal pattern 33 is a wiring pattern for an electrical connection with a liquid crystal driving IC (an electronic component) 36 which is provided for electrically driving the liquid crystal panel 2. In the present embodiment, the liquid crystal driving IC 36 is mounted in a COG (chip on glass) manner on the terminal pattern 33 which is formed on the mounting-terminal forming region 24c, such that the liquid crystal panel 2 and the liquid crystal driving IC 36 are electrically connected to each other. Of course, as a mounting structure, in addition to the COG mounting structure, other mounting structures such as FPC mounting structures or the like may be used.

Like the present embodiment, if the touch panel 4 is provided on the front surface of the liquid crystal panel 2, when an input operation is performed by pressing a surface of the touch panel 4 with a finger or an input tool 3, a display distortion in the liquid crystal panel 2 may occur. This is because the touch panel 4 is partially deformed by an input pressure and the front surface-side substrate 22a of the liquid crystal panel 2 provided on the rear surface of the touch panel 4 is somewhat deflected by the deformation. That is, the gap of the liquid crystal panel 2 is not more than 1 μm to 10 μm and thus, even when the deflection of the front surface-side substrate 22a is small, the deflection changes the gap of the liquid crystal panel 2 at a partially high rate. As a result, a display distortion such as an interference fringe occurs. Such a problem can be solved by sufficiently reducing the thickness of the rear surface-side substrate 22b of the liquid crystal panel 2. For example, the rear surface-side substrate 22b is reduced in thickness to about 0.1 mm to 0.4 mm such that the substrate is easily deflected. In this case, as described above, when the front surface-side substrate 22a of the liquid crystal panel 2 is deflected, the rear surface-side substrate 22b is deflected accordingly, such that the change in the gap is little. However, if the substrate is reduced in thickness, it may be hard to handle the substrate and the substrate may be cracked during the manufacturing process. Further, since the substrate is vulnerable to the mechanical impact, when the touch panel is used for portable devices, it is likely to be damaged by the impact such as being dropped. As such, in view of ease of handling the substrate or impact resistance, the substrate is preferably thick, while, in view of display quality, the substrate is preferably thin. Thus, in the present embodiment, in order to meet both demands, a thick glass substrate is used for the front surface-side substrate 22a to enhance the ease of handling, while, as shown in FIG. 1, a concave portion H2 (a thin-plate region) is provided in a portion for display to thin the rear surface-side substrate 22b and to make the rear surface-side substrate 22b follow the deformation of the front surface-side substrate 22a when the input is performed. In the present embodiment, the thickness of each of the front surface-side substrate 22a and the rear surface-side substrate 22b (a portion where the concave portion H2 is not formed) is about 0.5 mm and the thickness of the portion of the rear surface-side substrate 22b where the concave portion H2 is formed is about 0.1 mm to 0.4 mm.

The touch panel 4 is formed by integrally bonding a front surface-side substrate (a substrate at an upper side in FIG. 1; a first substrate) 8a and a rear surface-side substrate (a substrate at a lower side in FIG. 1; a second substrate) 8b, which face each other at a predetermined gap, by sealing materials 9 which are formed in ring shapes on peripheral portions of the two substrate 8a and 8b. As shown in FIG. 2, on a surface at an inner surface side (at the rear surface-side substrate side) of a substrate main body 11a made of a transmissive material of the front surface-side substrate 8a of the touch panel 4, a transmissive planar electrode (a high resistive film; a first electrode) 12a is formed to cover a range corresponding to a display region (an actual display region) of the liquid crystal panel 2. On both ends in a Y direction of the planar electrode 12a, a pair of low resistive films 13 are formed. On the other hand, on a surface at an inner surface side (at the front surface-side substrate side) of a substrate main body 11b made of a transmissive material of the rear surface-side substrate 8b of the touch panel 4, a transmissive planar electrode (a high resistive film; a second electrode) 12b is formed to cover a range corresponding to the display region of the liquid crystal panel 2. On both ends in an X direction of the planar electrode 12b, a pair of low resistive films 14 are formed. In the present embodiment, a region corresponding to the display region of the liquid crystal panel 2 on a surface at an outer surface side of the front surface-side substrate 8a (the viewing side) is a coordinate input surface (that is, a surface on which the input operation is performed by directly indicating a position on the touch panel with the input tool 3 or finger).

The low resistive films 13 formed on the front surface-side substrate 8a are electrically connected to auxiliary electrodes 18, which are formed on the rear surface-side substrate 8b, via connecting members 17 and also are electrically connected to a terminal portion 16 via the auxiliary electrodes 18. In the present embodiment, the low resistive films 13 and 14 and the auxiliary electrodes 18 constitute the wiring portion and are formed along the peripheral portions of the substrate 8a or the substrate 8b. Moreover, the planar electrode 12a and 12b are made of transmissive conductive films such as indium tin oxide (ITO) or the like. Each of the planar electrodes 12a and 12b has a uniform surface resistance over the entire surface region thereof. Further, the low resistive films 13 and 14, the auxiliary electrodes 18, and the terminal portion 16 are formed with metal thin films having high conductance, such as gold (Au), silver (Ag), copper (Cu), aluminum (Al), chromium (Cr), or an alloy including at least one of these metal materials. As described later, in the present embodiment, since the front surface-side substrate 8a and the rear surface-side substrate 8b are formed with glass substrates, a high-temperature heat treatment or an etching process using strongly acidic etching solutions can be performed, unlike the touch panel of the related art in which the plastic film substrate is used. For this reason, in the present embodiment, the conductive films (the planar electrodes 12a and 12b, the auxiliary electrodes 18, and the terminal portion 16) for detecting coordinate information are formed with a vacuum process such as a sputtering method or a deposition method. Further, the low resistive films 13 and 14, and the auxiliary electrodes 18 are reduced in thickness by the etching process, thereby forming the wiring portion having a narrow frame. For example, when APC (an alloy of silver, palladium, and copper and having the specific resistance of about $4 \times 10^{-6}$) is used for the wiring portion, a wiring line having the thickness of 0.2 μm and the line width of 0.1 mm can be implemented. In the related art, when silver paste is used, a wiring line having the thickness of 20 μm and the line width of 1 mm was implemented. Further, the specific resistances of copper, palladium, and chromium are $6 \times 10^{-6}$, $6 \times 10^{-6}$, $5 \times 10^{-5}$, respectively. Thus, even when these metal materials are used, the line width can be reduced in thickness by one to two digits as compared to the related art.

In the present embodiment, any of the substrate main bodies 11a and 11b constituting the front surface-side substrate 8a and the rear surface-side substrate 8b is made of a hard glass substrate. Typically, the front surface-side substrate 8a on which the input operation is performed needs to be deflected at the time of the input, and thus a plastic film substrate such as polycarbonate (PC), polyacrylate (PAr), polyethersulfone (PES), or the like may be used. However, such a plastic film substrate has large deflection due to the input load. Accordingly, when the input is repeatedly performed, the resistive films 12a and 13 formed at the inner surface side may be cracked, thereby deteriorating the input characteristics. On the other hand, like the present embodiment, when the front surface-side substrate 8a is made of a glass substrate, such a problem does not occur, but, since the hard glass substrate has low flexibility as compared to the plastic film substrate, if the input load is small, the input may be sufficiently performed. If the thickness of the glass substrate is reduced in thickness to about 0.1 mm to 0.2 mm, the above-described problem can be solved. In the case in which the substrate is reduced in thickness, however, it may be hard to handle the substrate or the substrate may be cracked during the manufacturing process. Further, since the substrate is vulnerable to the mechanical impact, when it is used for portable devices, it is likely to be damaged by the impact such as being dropped. As such, when the glass substrate is used, in view of ease of handling the substrate or durability and impact resistance of the input device, the substrate is preferably thick, while, in view of ease of the input or detection precision, the substrate is preferably thin. Therefore, in the present embodiment, in order to meet both demands, a thick glass substrate is used for the front surface-side substrate 8a to enhance the ease of handling. Further, as shown in FIG. 1, a concave portion H1 (a thin-plate region) is provided in a portion for coordinate input to thin the front surface-side substrate 8a to enhance input operationality or detection precision.

In the present embodiment, the total thickness of the front surface-side substrate 8a (a portion where the concave portion H1 is not formed) and the rear surface-side substrate 8b is equal to the total thickness of the front surface-side substrate 22a or the rear surface-side substrate 22b of the liquid crystal panel 2. As described above, since the touch panel 4 of the present embodiment has a structure in which two glass substrates are integrally bonded by the sealing materials, it can be basically manufactured by the same manufacturing method as that of the liquid crystal panel 2. For this reason, when the total thickness of the two substrates 8a and 8b of the touch panel 4 is substantially equal to the total thickness of the two substrates 22a and 22b of the liquid crystal panel 2, the manufacturing line of the liquid crystal panel 2 can be applied to the manufacturing line of the touch panel 4. For example, in the present embodiment, the total thickness of the front surface-side substrate 8a and the rear surface-side substrate 8b of the touch panel 4 is about 0.5 mm and the thickness of the portion the front surface-side substrate 8a where the concave portion H1 is formed is about 0.1 mm to 0.2 mm.

Further, in the present embodiment, a liquid material 15 for adjusting a refractive index is sealed into a space surrounded by the front surface-side substrate 8a, the rear surface-side substrate 8b, and the sealing materials 9. Preferably, as such a liquid material 15, silicon oil or the like which has a difference in refractive index from glass smaller than that from air is used. If such a liquid material is sealed, light emitted from the liquid crystal panel 2 is not reflected on an interface between the rear surface-side substrate 8b and the space or an interface between the space and the front surface-side substrate 8a, thereby realizing bright display. Further, the liquid material 15 arranged between the substrates functions as a cushion, such that an impact applied to the front surface-side substrate 8a can be relieved. That is, in the present embodiment, since the coordinate input surface of the front surface-side substrate 8a is formed thinner than other portions thereof, it is vulnerable to the mechanical impact as compared to a typical one. In this case, however, if the portion corresponding to the coordinate input surface is reinforced by such a buffing structure, such a defect can be covered. In consideration of the function as the cushion, viscosity of the liquid material 15 is preferably in a range of from 2 mm$^2$/s to 5000 mm$^2$/s. Alternatively, a buffing member made of an elastic member may be arranged between the substrates. As the buffing member, a soft material such as silicon or urethane (for example, a material having a modulus of elasticity ranging from $1 \times 10^4$ N/m$^2$ to $1 \times 10^8$ N/m$^2$) is preferably used. The buffing structure may also be used as a spacer which controls the gap between the substrates 8a and 8b.

The touch panel 4 and the liquid crystal panel 2 constructed in such a manner are optically bonded by an adhesive 50 including a transmissive elastic member (for example, a transmissive elastic member, such as silicon gel, acryl gel, urethane gel, urethane rubber, or the like, which has a difference in refractive index from glass than that from air). Then, the touch panel 4 and the liquid crystal panel 2 are housed into a case such as a bezel or the like. In FIG. 1, reference numeral 52 denotes a portion of the case. The case 52 has a window corresponding to the display region of the liquid crystal panel 2, such that the input is performed on the touch panel 4 through the window. Further, a peripheral portion of the window of the case 52 presses an outer surface of the front surface-side substrate 8a of the touch panel 4 (the surface at the viewing side) toward the liquid crystal panel 2. The touch panel 4 is fixed on the liquid crystal panel 2 by a biasing force from the case 52. Here, a stress from the case 52 causes an erroneous input on the touch panel 4. For this reason, in the present embodiment, a circumferential position P1 of the concave portion H1 of the front surface-side substrate 8a of the touch panel 4 is arranged outside an internally circumferential position P2 of the sealing material 9 of the touch panel 4 (an opposite side to the coordinate input surface), such that the stress from the case 52 is not applied to the coordinate input surface of the touch panel 4. As described above, in the present embodiment, since the concave portion H1 is formed in the front surface-side substrate 8a, the peripheral portion of the window of the case 52 is arranged on the thick-plate region of the front surface-side substrate 8a which is provided in a frame shape around the concave portion H1. For this reason, the stress from the case 52 is applied to only the thick-plate region outside the concave portion H1, not the thin-plate region inside the concave portion H1. On the contrary, if the thick-plate region is provided to the inside of the sealing material 9, some of the stress is applied to the inside of the sealing material 9, the front surface-side substrate 8a disposed at the inside of the sealing material 9 is deflected toward the rear surface-side substrate, thereby causing an erroneous input. On the contrary, in the present embodiment, the circumferential point P1 of the concave portion H1 is arranged outside the internally circumferential point P2 of the sealing material 9 and the thick-plate region of the front surface-side substrate 8a is arranged on or outside the sealing material 9. Therefore, even when the stress is applied to the thick-plate region, there is no case in which the front surface-side substrate 8a at the inside of the sealing material 9 is deflected accordingly.

On an upper surface and a lower surface of the touch panel 4 and the input device 2 integrated in such a manner (that is, a surface at the viewing side of the front surface-side substrate 8a of the touch panel 4 and a surface of the rear surface-side substrate 22b of the liquid crystal panel 2 opposite to the viewing side), a front surface-side polarizing plate (a first optical film) 6a and a rear surface-side polarizing plate (a third optical film) 6b are arranged, respectively. That is, the liquid crystal display device 1 of the present embodiment is a so-called inner-type liquid crystal display device in which the touch panel 4 and the liquid crystal panel 2 are integrated and disposed between the pair of polarizing plates 6a and 6b. From these polarizing plates 6a and 6b, the front surface-side polarizing plate 6a provided at the viewing side of the touch panel 4 is provided inside the concave portion H1 which is formed on the front surface-side substrate 8a. Further, the rear surface-side polarizing plate 6b provided opposite to the viewing side of the liquid crystal panel 2 is provided inside the concave portion H2 which is formed on the rear surface-side substrate 22b. As such, in the present embodiment, the polarizing plates 6a and 6b are arranged in the concave portions H1 and H2 of the substrates 8a and 22b, respectively. Accordingly, the entire liquid crystal display device can be reduced in thickness. Moreover, in FIG. 1, as an optical film, only the front surface-side polarizing plate 6a and the rear surface-side polarizing plate 6b are shown. In this case, when a circular polarization mode is adopted, a phase plate such as a half wave plate, a quarter wave plate, or the like may be additionally provided as an optical film. When the phase plates are provided, similarly to the polarizing plates 6a and 6b, these are preferably arranged in the concave portions H1 and H2 of the substrates. Here, when the polarizing plate (the first optical film) 6a and the phase plate (a second optical film) are laminated on the front surface-side substrate 8a of the touch panel 4, if the total thickness of these optical members is large, an input pressure is not sufficiently transferred to the coordinate input surface. Therefore, in this case, the polarizing plate 6a and the phase plate may be separately attached on an upper side and a lower side of the touch panel 4 (that is, the front surface-side polarizing plate 6a serving as the first optical film is arranged in the concave portion H1 of the front surface-side substrate 8a of the touch panel 4 and the phase plate serving as the second optical film is arranged between the touch panel 4 and the liquid crystal panel 2). In such a manner, the input operation can be easily performed.

Input Operation on Touch Panel

Next, the input operation on the touch panel 4 will be described.

In the touch panel 4, an input control circuit (not shown) is connected to the terminal portion 16 and a predetermined voltage is applied between the low resistive films 14 and 14 disposed at both ends in the X direction of the rear surface-side substrate 8b at a certain point by the input control circuit. A voltage measuring unit (a voltage measuring circuit or a voltage measuring element, not shown) in the input control circuit is electrically connected between the low resistive films 13 and 13 disposed at both ends in the Y direction of the front surface-side substrate 8a. At this point, on the planar electrode 12b of the rear surface-side substrate 8b, a voltage linearly changes in the X direction, that is, a uniform voltage drop occurs. Then, a voltage distribution is configured such that portions having the same positional coordinate axis in the X direction have the same potential. At this time, if a portion of the coordinate input surface of the front surface-side substrate 8a is pressed with a tip of the input tool 3, the planar electrode 12a of the front surface-side substrate 8a comes in contact with the planar electrode 12b of the rear surface-side substrate 8b and, via the planar electrode 12a of the front surface-side substrate 8a, a voltage of the planar electrode 12b at a position corresponding to the portion pressed by the input tool 3 is measured by the input control circuit. The value of the measured voltage is related to a positional coordinate in the X direction of the pressed portion, and thus the input control circuit can detect a position in the X direction of the portion pressed by the input tool 3.

On the other hand, at another certain point, a predetermined voltage is applied between the low resistive films 13 and 13 disposed at both ends in the Y direction of the front surface-side substrate 8a by the input control circuit. Then, the voltage measuring unit is connected between the low resistive films 14 and 14 disposed both ends in the Y direction of the rear surface-side substrate 8b. At this point, on the planar electrode 12a of the front surface-side substrate 8a, a uniform voltage drop occurs in the Y direction and a voltage distribution in which a voltage linearly changes is formed. The input control circuit detects a voltage of the planar electrode 12a of the front surface-side substrate 8a at the position corresponding to the portion pressed by the input tool 3 via the planar electrode 12b of the rear surface-side substrate 8b. In such a manner, similarly to the position in the X direction, a position in the Y direction of the pressed portion can be detected.

Switching between two connection states with regard to the input control circuit is repeatedly performed for a short time, and thus the input control circuit can detect the positional coordinate value in the X direction and the positional coordinate value in the Y direction of the portion pressed by the input tool 3.

Manufacturing Method of Liquid Crystal Display Device

Next, a manufacturing method of the liquid crystal display device 1 of the present embodiment will be described.

First, a manufacturing method of the touch panel 4 will be described with reference to FIGS. 4A to 4D. In the present embodiment, a method in which a plurality of touch panels 4 are formed in a lump with large mother substrates, each having a plurality of substrate regions, and the respective touch panels 4 are separated from each other by cutting is adopted.

Figure 4A:
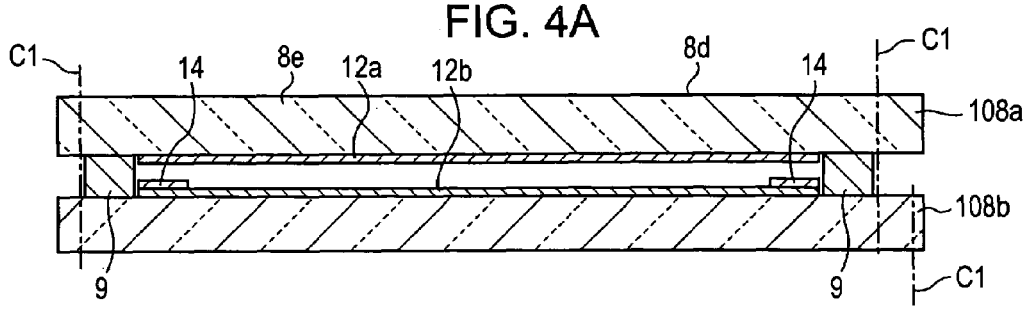
FIG. 4A is a process view illustrating a method of manufacturing a liquid crystal display device of the invention.

In this method, first, as shown in FIG. 4a, a first mother substrate 108a including a plurality of substrate regions, each serving as the front surface-side substrate 8a of the touch panel 4, and a second mother substrate 108b including a plurality of substrate regions, each serving as the rear surface-side substrate 8b, are prepared. Then, on each of the substrate regions 8d of the first mother substrate 108a, the planar electrode 12a and the low resistive films 13 are formed. On each of the substrate regions 8d of the second mother substrate 108b, the planar electrode 12b, the low resistive films 14, the auxiliary electrodes 18, and the terminal portion 16 are formed. Here, as the mother substrate 108a or 108b, a thick substrate having the thickness of 0.5 mm is used. If the two substrates 108a and 108b have the different thickness, in a step of FIG. 4C, when cutting the substrate, a stress is dispersed, such that cutting cannot be performed. Thus, both substrates 108a and 108b substantially have the same thickness.

Further, in the present embodiment, the conductive films for detecting coordinate information (the planar electrodes 12a and 12b, the low resistive films 13 and 14, the auxiliary electrodes 18, and the terminal portion 16) are formed with the vacuum process such as the sputtering method or the deposition method and are patterned in desired shapes by photolithography techniques. In the present embodiment, first, a transmissive conductive film made of ITO or the like and a low resistive metal film made of silver or the like are sequentially formed on a surface of the first mother substrate 108a by the sputtering method or the deposition method. Then, the metal film at an upper layer side is etched and patterned in a shape of each of the low resistive films 13. Subsequently, the transmissive conductive film disposed at a lower layer side is etched and patterned in a shape of the planar electrode 12a. The same can be applied to the counter substrate. That is, first, on a surface of the second mother substrate 108b, a transmissive conductive film made of ITO or the like and a low resistive metal film made of silver or the like are sequentially formed by the sputtering method or the deposition method. Then, the metal film at an upper layer side is etched and patterned in a shape of each of the low resistive films 14, the auxiliary electrodes 18, and the terminal portion 16. Subsequently, the transmissive conductive film disposed at a lower layer side is etched and patterned in a shape of the planar electrode 12b. Moreover, the film formation of each of the metal film and the transmissive conductive film is performed under a high temperature condition, such that a fine film with no defect is formed.

As a method of patterning the conductive film, the following method may be adopted. First, on the surface of the first mother substrate 108a, the transmissive conductive film made of ITO or the like and the low resistive metal film made of silver or the like are sequentially formed by the sputtering method or the deposition method. Then, the films are simultaneously etched and patterned in a combined shape of the planar electrode 12a and the low resistive films 13. Subsequently, the metal film disposed at the upper layer side is etched and patterned in the shape of each of the low resistive films 13. The same is applied to the counter substrate. That is, first, on the surface of the second method substrate 108b, the transmissive conductive film made of ITO or the like and the low resistive film made of silver or the like are sequentially formed by the sputtering method or the deposition method. Then, the films are simultaneously etched and patterned in a combined shape of the planar electrode 12b, the low resistive films 14, the auxiliary electrodes 18, and the terminal portion 16. Subsequently, the metal film disposed at the upper layer is etched and patterned in the shape of each of the low resistive films 14, the auxiliary electrodes 18, and the terminal portion 16.

By adopting such a process, a film structure having a low interfacial resistance between the planar electrode and the wiring portion can be obtained. Further, the wiring portion having a narrow frame can be formed by using photolithography techniques.

After the conductive films are formed in such a manner, the sealing material 9 is formed on a peripheral portion of each substrate region 8d of the first mother substrate 108a or the second mother substrate 108b by a printing method. Here, an injecting inlet (not shown) for injecting the liquid material 15 is formed in a portion of the formed sealing material 9. Further, on one of the mother substrates, a buffing member for relieving an impact applied to the front surface-side substrate is formed by using a soft material such as silicon or urethane. This buffing structure may be used as a spacer structure for gap control. Subsequently, the two mother substrates 108a and 108b are arranged, such that corresponding substrate regions 8d face each other, and are bonded by pressing one mother substrate on the other mother substrate. FIG. 4A shows a case in which the mother substrates are boned such that corresponding substrate regions 8d face each other. Moreover, reference numeral C1 denotes a cutting line when the mother substrates 108a and 108b are cut.

Figure 4B:
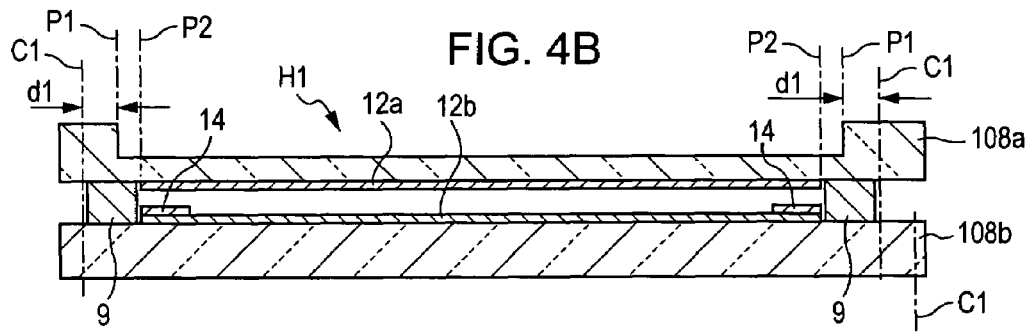
FIG. 4B is a process view illustrating the method of manufacturing a liquid crystal display device of the invention.

Next, as shown in FIG. 4B, the portion of each substrate region of the first mother substrate 108a serving as the coordinate input surface is selectively reduced in thickness to form the concave portion (the thin-plate region) H1. In the present embodiment, after other portions than the portion serving as the coordinate input surface are masked with resist or the like, chemical etching is performed by using a fluoric acid-based etching solution, such that the thickness of the portion of the substrate where the concave portion H1 is formed is in a range of from about 0.1 mm to 0.2 mm. At this time, in a step of FIG. 4C, in order to easily cut the substrates, an interval d1 between the cutting line C1 and the circumferential position P1 of the concave portion H1 (that is, a frame width of the thick-plate region arranged in a frame shape around the concave portion H1) is set to be equal to or more than 0.3 mm. Further, the circumferential position P1 of the concave portion H1 is arranged outside the internally circumferential position P2 of the sealing material 9 (outside the coordinate input surface) and the thick-plate region is arranged on or outside the sealing material 9 provided in the ring shape.

Figure 4C:
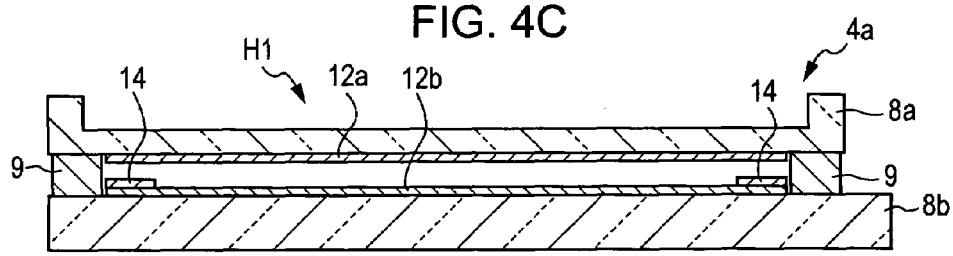
FIG. 4C is a process view illustrating the method of manufacturing a liquid crystal display device of the invention.
Figure 4D:
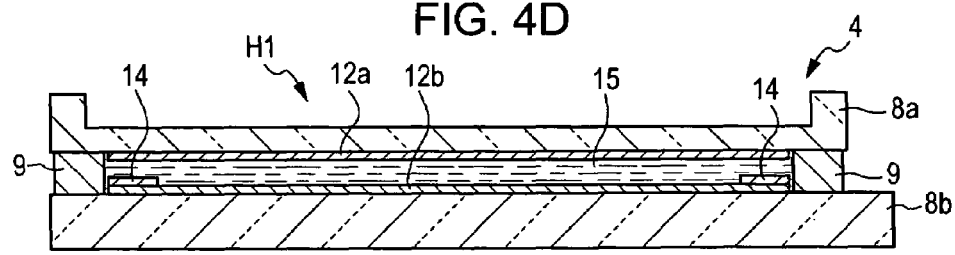
FIG. 4D is a process view illustrating the method of manufacturing a liquid crystal display device of the invention.

Next, the first and second mother substrates 108a and 108b are cut along the peripheries of the respective substrate region 8d to obtain a plurality of blank panels (touch panels before the liquid material 15 is injected) 4a shown in FIG. 4C. Subsequently, as shown in FIG. 4D, the liquid material 15 is injected into the gap trough the injecting inlet of each blank panel 4a in a vacuum manner. Then, a sealing material such as mold resin or the like is filled in the injecting inlet and hardened to seal the injecting inlet. In such a manner, the touch panel 4 is manufactured.

Moreover, the liquid material 15 is filled by using the vacuum injection method in the present embodiment, but the liquid material 15 may be filled by using other methods. First, the sealing material 9 is formed in a closed ring shape on one of the mother substrate and the liquid material 15 is disposed in liquid droplets on the one of the mother substrates or the other substrate in droplets. Then, under a vacuum condition, these mother substrates are bonded and the sealing member 9 is hardened. Finally, the first and second mother substrates 108a and 108b are cut to separate the plurality of touch panels 4 from each other.

Next, a manufacturing method of the liquid crystal panel 2 will be described with reference to FIGS. 5A to 5D. In the present embodiment, a method in which a plurality of liquid crystal panels 2 are formed in a lump with large mother substrates, each having a plurality of substrate regions, and the respective liquid crystal panels 2 are separated from each other by cutting is adopted.

Figure 5A:
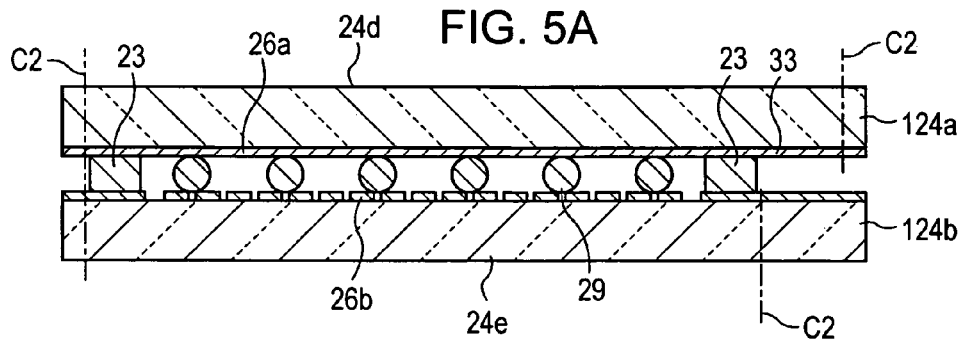
FIG. 5A is a process view illustrating the method of manufacturing a liquid crystal display device of the invention.

In this method, first, as shown in FIG. 5A, a third mother substrate 124a including a plurality of substrate regions, each serving as the front surface-side substrate 22a of the liquid crystal panel 2, and a fourth mother substrate 124b including a plurality of substrate regions, each serving as the rear surface-side substrate 22b, are prepared. Then, on each of the substrate regions 24d of the third mother substrate 124a, the front surface-side electrode 26a, the liquid crystal alignment control layer having the alignment film (not shown) or the like, and the terminal pattern 33 are formed. Further, on each of the substrate regions 24d of the fourth mother substrate 124b, the rear surface-side electrodes 26b and the liquid crystal alignment control layer having the alignment film (not shown) or the like are formed. Here, as the mother substrate 124a or 124b, a thick substrate having the thickness of 0.5 mm is used. If the two substrates 124a and 124b have the different thickness, in a step of FIG. 5C, when cutting the substrate, a stress is dispersed, such that cutting cannot be performed. Thus, both substrates 124a and 124b have the substantially same thickness.

Next, the sealing material 23 is formed in a ring shape on the peripheral portion of each substrate region of the third mother substrate 124a or the fourth mother substrate 124b by the printing method. Here, an injecting inlet (not shown) for injecting liquid crystal 32 is formed in a portion of the formed sealing material 23. Further, on one of the mother substrates, spacers 29 for gap control are provided. Subsequently, the two mother substrates 124a and 124b are arranged, such that corresponding substrate regions 24d face each other, and are bonded by pressing one mother substrate on the other mother substrate. FIG. 5A shows a case in which the mother substrates are boned such that corresponding substrate regions 24d face each other. Moreover, reference numeral C2 denotes a cutting line when the mother substrates 124a and 124b are cut.

Figure 5B:
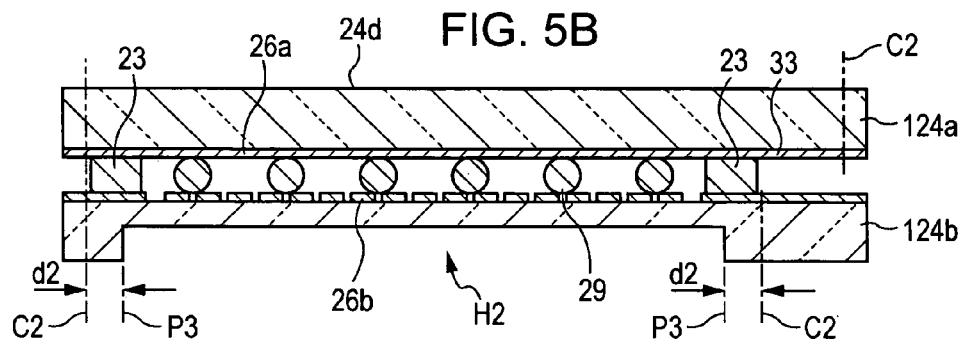
FIG. 5B is a process view illustrating the method of manufacturing a liquid crystal display device of the invention.

Next, as shown in FIG. 5B, the portion of each substrate region 24d corresponding to the coordinate input surface of the touch panel 4 at the lower surface side of the fourth mother substrate 124b (an opposite side to the viewing side) is selectively reduced in thickness to form the concave portion H2 (the thin-plate region). In the present embodiment, after other portions than the portion of the substrate region 24d corresponding to the coordinate input surface are masked with resist or the like, chemical etching is performed by using a fluoric acid-based etching solution, such that the thickness of the portion of the substrate where the concave portion H2 is formed is in a range of from about 0.1 mm to 0.4 mm. At this time, in a step of FIG. 5C, in order to easily cut the substrates, an interval d2 between the cutting line C2 and the circumferential position P3 of the concave portion H2 (that is, a frame width of the thick-plate region arranged in a frame shape around the concave portion H2) is set to be equal to or more than 0.3 mm.

Figure 5C:
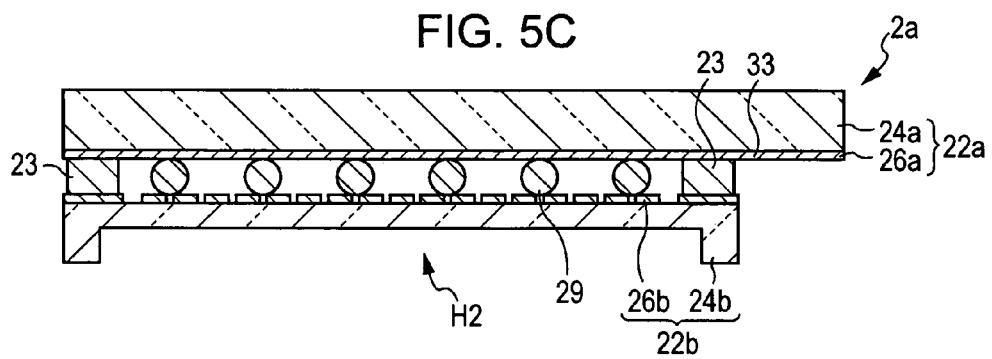
FIG. 5C is a process view illustrating the method of manufacturing a liquid crystal display device of the invention.
Figure 5D:
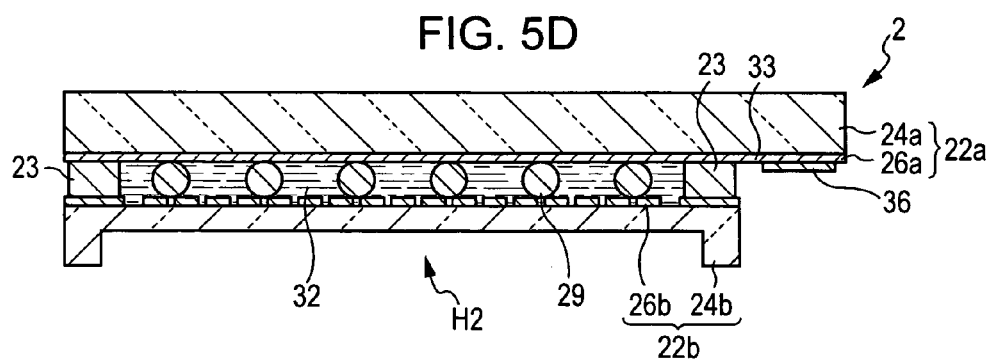
FIG. 5D is a process view illustrating the method of manufacturing a liquid crystal display device of the invention.

Next, the third and fourth mother substrates 124a and 124b are cut along the peripheries of the respective substrate region 24d to obtain a plurality of blank panels (liquid crystal panels before the liquid crystal 32 is injected) 2a shown in FIG. 5C. Subsequently, as shown in FIG. 5D, the liquid crystal 32 is injected into the gap trough the injecting inlet of each blank panel 2a in a vacuum manner. Then, a sealing material such as mold resin or the like is filled in the injecting inlet and hardened to seal the injecting inlet.

Next, the liquid crystal driving IC 36 is mounted on the terminal pattern 33, which is formed on the mounting-terminal forming region 24c of the liquid crystal panel 2, in the COG manner, such that the liquid crystal panel 2 and the liquid crystal driving IC 36 are electrically connected. In such a manner, the liquid crystal panel 2 is manufactured.

Moreover, the liquid crystal 32 is filled by using the vacuum injection method in the present embodiment, but the liquid crystal 32 may be filled by using other methods. First, the sealing material 23 is formed in the closed ring shape on one of the mother substrate and the liquid crystal 32 is disposed on the one of the mother substrates or the other mother substrate in droplets. Then, under a vacuum condition, these mother substrates are bonded and the sealing member 23 is hardened. Finally, the third and fourth mother substrates 124a and 124b are cut to separate the plurality of liquid crystal panels 2 from each other.

Figure 6:
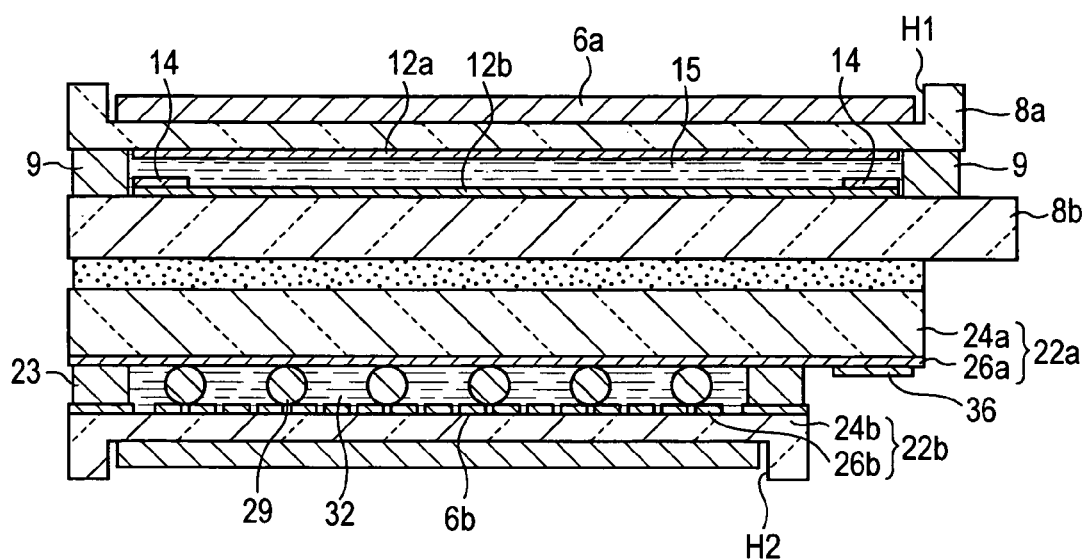
FIG. 6 is a process view illustrating the method of manufacturing a liquid crystal display device of the invention.

As such, after the touch panel 4 and the liquid crystal panel 2 are manufactured, as shown in FIG. 6, the front surface-side substrate 22a of the liquid crystal panel 2 and the rear surface-side substrate 8b of the touch panel 4 are optically bonded by the adhesive 50. As the adhesive 50, a transmissive elastic member such silicon gel or the like is preferably used. Since the elastic member is used, the input stress can be relieved and the display distortion of the liquid crystal panel 2 can be improved. Further, since the touch panel 4 and the liquid crystal panel 2 are optically bonded, an optical loss can be further reduced, such that bright display can be performed. Moreover, as the adhesive 50, a both-sided tape may be used. In this case, the both-sided tape is preferably provided in a ring shape on the peripheral portion of the substrate, such that an interval between the liquid crystal panel 2 and the touch panel 4 is provided. In such a manner, a structure in which the input stress is not transferred to the liquid crystal panel 2 can be implemented.

Next, the polarizing plate 6a is adhered to the front surface of the front surface-side substrate 8a of the touch panel 4 (the surface at the viewing side) and the polarizing plate 6b is adhered to the rear surface of the rear surface-side substrate 22b of the liquid crystal panel 2 (the surface opposite to the viewing side). The respective polarizing plates 6a and 6b are arranged in the concave portions H1 and H2 respectively formed in the substrates 8a and 22b. FIG. 6 shows a case in which the polarizing plates 6a and 6b are adhered.

In such a manner, a touch panel-integrated liquid crystal display device 1 is manufactured.

As described above, in the present embodiment, since both of the front surface-side substrate 8a and the rear surface-side substrate 8b of the touch panel 4 are made of the hard glass substrates, the excessive deformation of the substrates when the input operation is performed can be suppressed. For this reason, the cracks hardly occur in the resistive films 12a and 13 and the like, such that a liquid crystal display device having high durability can be implemented as compared to the related art. Further, since the high-temperature heat treatment can be performed, the film quality of the planar electrode 12a or 12b can be improved, thereby implementing a bright liquid crystal display device. Further, in the present embodiment, since the coordinate input surface of the front surface-side substrate 8a of the touch panel 4 is reduced in thickness, the input load according to the input operation can be reduced and the detection precision can be increased. In particular, in the present embodiment, since only the portion corresponding to the coordinate input surface, not the entire substrate, is selectively etched and reduced in thickness, the ease of handling the substrate or the impact resistance can be prevented from damaging during the manufacturing process. Further, when the thin-plate region is provided in the substrate in such a manner, the weight of the substrate is also lightened, such that the touch panel is lightened. Further, since a typical semiconductor process may be used, the conductive film having the low interfacial resistance can be formed. In addition, since an extremely fine wiring pattern can be formed by etching or the like, the wiring region having the narrow frame can be implemented.

Further, in the present embodiment, the rear surface-side substrate 22b of the liquid crystal panel 2 is etched such that the portion corresponding to the coordinate input surface is reduced in thickness. Thus, the display distortion due to the input operation on the touch panel 4 can be improved. Further, since the thin-plate region is formed in the substrate, the liquid crystal panel can be lightened. Further, in the present embodiment, since the polarizing plates 6a and 6b are arranged in the concave portions H1 and H2, respectively, the liquid crystal display device can be reduced in thickness by the depths of the concave portions H1 and H2.

Further, in the present embodiment, since the liquid material 15 for adjusting the refractive index is sealed between the substrates of the touch panel 4, bright display can be performed. Further, since the sealed liquid material 15 functions as the cushion for relieving the input stress, the impact resistance of the touch panel 4 can also be increased. Further, in the present embodiment, since the touch panel 4 and the liquid crystal panel 2 are optically bonded by the transmissive elastic member, bright display can be performed with low distortion.

Moreover, in the present embodiment, an example in which the invention is applied to the resistive film-type touch panel is described. However, the invention is not limited to the resistive film-type touch panel. For example, the invention can be applied to other types of touch panels such as capacitive touch panels or ultrasonic touch panels. Further, as a display unit, in addition to the above-described liquid crystal panel, other electro-optical panels such as organic electroluminescent (EL) panels or electrophoretic panels can be used.

Electronic Apparatus

Hereinafter, a specified example of an electronic apparatus having the above-described electro-optical device will be described.

Figure 7:
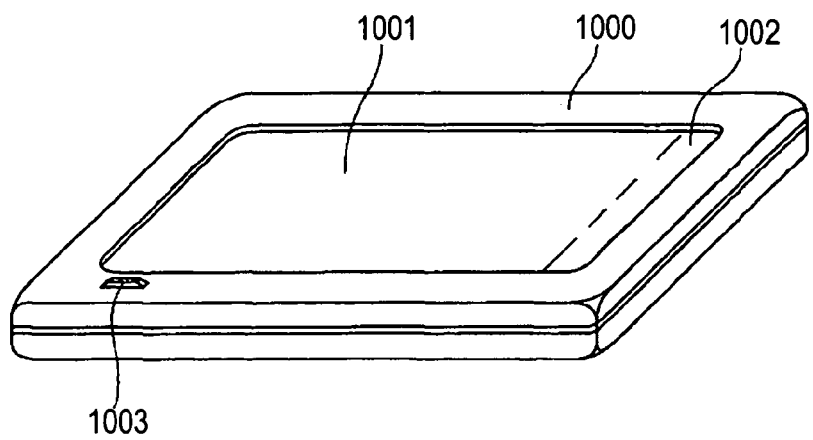
FIG. 7 is a perspective view showing an example of an electronic apparatus of the invention.

FIG. 7 is a perspective view showing a handy terminal 1000 which is an example of an electronic apparatus of the invention. In FIG. 7, reference numeral 1001 denotes a touch panel which is the input device of the invention, reference numeral 1002 denotes a function key, and reference numeral 1003 denotes a power input switch. In the handy terminal 1000, data is input by directly indicating icons printed in the function key 1002 or a position on the touch panel while viewing the screen of the liquid crystal panel (not shown) arranged below the touch panel 1001. Since the handy terminal 1000 has the above-described touch panel of the invention as the input device, it can be implemented as an electronic apparatus which can perform bright display, is excellent in operationality, and has high reliability.

Moreover, the electro-optical device of the embodiment can be mounted on various electronic apparatuses, as well as the above-described handy terminal. As the electronic apparatus, for example, a cellular phone, an electronic book, a personal computer, a digital still camera, a liquid crystal television, a viewfinder-type or monitor-direct-view-type video tape recorder, a car navigation device, a pager, an electronic organizer, an electronic calculator, a word processor, a workstation, a video phone, a POS terminal, and the like may be exemplified. The electro-optical device can be suitably used as an image display unit and an input unit.

As described above, the preferred embodiment according to the invention was described with reference to the accompanying drawings. However, it is needless to say that the invention is not limited to the embodiment. Further, the shapes of the respective elements or the combination thereof in the above-described embodiment are examples. Various modifications can be made within a scope without departing from the spirit of the invention, based on demands for designs.

What is claimed is:

1. An electro-optical device comprising:
   an electro-optical panel;
   an input device, that is arrange over a front surface of the electro-optical panel, including
   a first substrate that has a coordinate input surface;
   a second substrate that faces the first substrate, wherein the first substrate and the second substrate are made of glass substrates; and
   an indicator that directly indicates a position of the coordinate input surface where input is possible;
   wherein the first substrate includes a distinct thin-plate region, at the coordinate input surface of the first substrate, having a thickness that is uniform and substantially thinner than the periphery of the coordinate input surface;
   wherein a liquid material is sealed between the first substrate and the second substrate, wherein the liquid material has a difference in refractive index from glass smaller than a difference in refractive index from air;
   wherein the electro-optical panel is a liquid crystal panel which includes a third substrate arranged on the front surface of the electro-optical panel, a fourth substrate facing the third substrate, and liquid crystal interposed between the third substrate and the fourth substrate;
   wherein the fourth substrate includes a thin-plate region at a position facing the coordinate input surface of the input device, wherein the thin-plate region of the fourth substrate is at a surface opposite to a flat surface of the fourth substrate, wherein the flat surface is in direct contact with the liquid crystal, wherein the thin-plate region of the fourth substrate has a thickness that is uniform and thinner than the periphery of the fourth substrate.

2. The electro-optical device according to claim 1, wherein the thin-plate region is formed to enable flexible movement.

3. The electro-optical device according to claim 1, wherein the first substrate and the second substrate are bonded by sealing materials which are provided in ring shapes on peripheral portions of the first and second substrates, and
   a circumferential position of the thin-plate region of the first substrate is arranged, in a plan view, within a region where the sealing material is formed or on a region outside the sealing material.

4. The electro-optical device according to claim 1,
   wherein a first optical film is provided on the front surface of the electro-optical panel and is arranged on the thin-plate region that is formed on the first substrate of the input device.

5. The electro-optical device according to claim 4,
   wherein a second optical film is provided between the electro-optical panel and the first optical film and is arranged on the thin-plate region that is formed on the first substrate of the input device.

6. The electro-optical device according to claim 4,
   wherein a second optical film is provided between the electro-panel and the first optical film and is arranged between the electro-optical panel and the input device.

7. The electro-optical device according to claim 1,
   wherein a third optical film is provided on a rear surface of the electro-optical panel and is arranged in the thin-plate region that is formed in the fourth substrate of the electro-optical panel.

8. An electronic apparatus comprising the electro-optical device according to claim 1.

9. The electro-optical device according to claim 1, wherein both ends of the first substrate each have greater thickness than the thin plate region.

* * * * *